US012407805B2

(12) United States Patent
Mori et al.

(10) Patent No.: US 12,407,805 B2
(45) Date of Patent: Sep. 2, 2025

(54) IMAGE CAPTURING APPARATUS FOR CAPTURING A PLURALITY OF EYEBALL IMAGES, IMAGE CAPTURING METHOD FOR IMAGE CAPTURING APPARATUS, AND STORAGE MEDIUM

(71) Applicant: CANON KABUSHIKI KAISHA, Tokyo (JP)

(72) Inventors: Kensaku Mori, Kanagawa (JP); Yosuke Mine, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 18/355,152

(22) Filed: Jul. 19, 2023

(65) Prior Publication Data

US 2024/0031551 A1 Jan. 25, 2024

(30) Foreign Application Priority Data

Jul. 21, 2022 (JP) .................................. 2022-116420

(51) Int. Cl.
*H04N 13/296* (2018.01)
*G06F 3/01* (2006.01)
*H04N 13/239* (2018.01)

(52) U.S. Cl.
CPC ........... *H04N 13/296* (2018.05); *G06F 3/013* (2013.01); *H04N 13/239* (2018.05)

(58) Field of Classification Search
None
See application file for complete search history.

(56) References Cited

U.S. PATENT DOCUMENTS

| | | | |
|---|---|---|---|
| 2011/0249868 A1* | 10/2011 | Tsukizawa | A61B 5/163 382/103 |
| 2019/0232501 A1* | 8/2019 | Funazukuri | G06N 3/008 |
| 2021/0357027 A1* | 11/2021 | Yamasaki | H04N 23/60 |
| 2021/0389595 A1* | 12/2021 | Yasuda | G06F 3/04842 |
| 2022/0003632 A1* | 1/2022 | Glasenapp | G02C 7/027 |
| 2022/0036779 A1* | 2/2022 | Nishibe | G06T 7/20 |
| 2022/0257110 A1* | 8/2022 | Ito | A61B 3/032 |
| 2023/0224561 A1* | 7/2023 | Ito | G06V 40/18 348/262 |
| 2023/0393655 A1* | 12/2023 | Mizuo | G02B 27/0093 |

FOREIGN PATENT DOCUMENTS

| | | |
|---|---|---|
| JP | H11259225 A | 9/1999 |
| JP | 2002007053 A | 1/2002 |
| JP | 2019063310 A | 4/2019 |
| WO | 2022038815 A1 | 2/2022 |

* cited by examiner

Primary Examiner — Talha M Nawaz
(74) Attorney, Agent, or Firm — Canon U.S.A., Inc., IP Division (57) ABSTRACT

An image capturing apparatus includes a first line-of-sight detector configured to capture a first eyeball image as a left eyeball image and detect a first line of sight based on the first eyeball image at a first cycle, and a second line-of-sight detector configured to capture a second eyeball image as a right eyeball image and detect a second line of sight based on the second eyeball image at the first cycle. A timing of starting to capture the first eyeball image and a timing of starting to capture the second eyeball image are different from each other.

15 Claims, 6 Drawing Sheets

IMAGE CAPTURING APPARATUS FOR CAPTURING A PLURALITY OF EYEBALL IMAGES, IMAGE CAPTURING METHOD FOR IMAGE CAPTURING APPARATUS, AND STORAGE MEDIUM

BACKGROUND

Field

The present disclosure relates to an image capturing apparatus for capturing a plurality of eyeball images, an image capturing method for the image capturing apparatus, and a storage medium.

Description of the Related Art

There is a mixed reality (MR) technique called "X Reality" or "Extended Reality". The MR technique combines physical and virtual spaces seamlessly. With an MR system using a video-seethrough head-mounted display (HMD), a user wearing the HMD sees a composite image created by superimposing a computer graphics (CG) image on a physical space image captured by an image capturing unit included in the HMD. These images each correspond to the right and left eyes separately, presenting a three-dimensional MR space in a stereo moving image to a user wearing an HMD. An MR space less likely to cause a sense of awkwardness to a user can be provided by a technique, in addition to the above described technique, of acquiring eyeball images of a user wearing an HMD, detecting the directions of the lines of sight of the user wearing the HMD, and generating CG images suited to the lines of sight of the user wearing the HMD, by built-in units of the HMD. In recent years, there has been a demand for an enhanced performance of acquiring results of line-of-sight direction detections supporting improved frame rates of composite images to be provided to a user wearing an HMD in order to provide a higher quality MR space.

There are known several techniques to meet the demand. For example, Japanese Patent Application Laid-Open No. 2019-63310 discloses a method for improving the accuracy of detecting lines of sight by once detecting positions of lines of sight of the left and right eyes of a user looking at a display screen for work, and combining and compositing results of the detected positions. Further, Japanese Patent Application Laid-Open No. 2002-7053 discloses a method for using a result of a determination that indicates that a user has blinked either his or her left eye or right eye without blinking the other in detection of blinking left and right eyes as a determination signal for performing input operations on a device.

To provide a higher quality MR space, however, there is also a demand for speeding up a cycle of reading out the result through rapid acquisition of a line-of-sight direction detection result, in addition to the accuracy of line-of-sight detections. Japanese Patent Application Laid-Open No. 2019-63310 discusses a method for improving the accuracy of line-of-sight detections using a plurality of line-of-sight detecting units, but does not touch upon a method for improving a cycle of reading out a line-of-sight direction detection result. Japanese Patent Application Laid-Open No. 2002-7053 discloses a technique of determining a change in eye using a plurality of line-of-sight detecting units, but does not touch upon a method for improving a cycle of reading out a line-of-sight direction detection result.

On the other hand, for the purpose of improving a cycle of reading out a line-of-sight direction detection result, implementing a high frame rate image capturing element and increasing communication bus width to improve data transfer bandwidth between devices leads to an increase in cost.

SUMMARY

According to an aspect of the present disclosure, an image capturing apparatus includes a first line-of-sight detector configured to capture a first eyeball image as a left eyeball image and detect a first line of sight based on the first eyeball image at a first cycle, and a second line-of-sight detector configured to capture a second eyeball image as a right eyeball image and detect a second line of sight based on the second eyeball image at the first cycle. A timing of starting to capture the first eyeball image and a timing of starting to capture the second eyeball image are different from each other.

Further features of the present disclosure will become apparent from the following description of exemplary embodiments with reference to the attached drawings.

DESCRIPTION OF THE EMBODIMENTS

Some exemplary embodiments will be described below with reference to the accompanied drawings. The following exemplary embodiments are not intended to limit the scope of the claimed disclosure, and not all combinations of the features described in the exemplary embodiments are used.

Figure 1A:
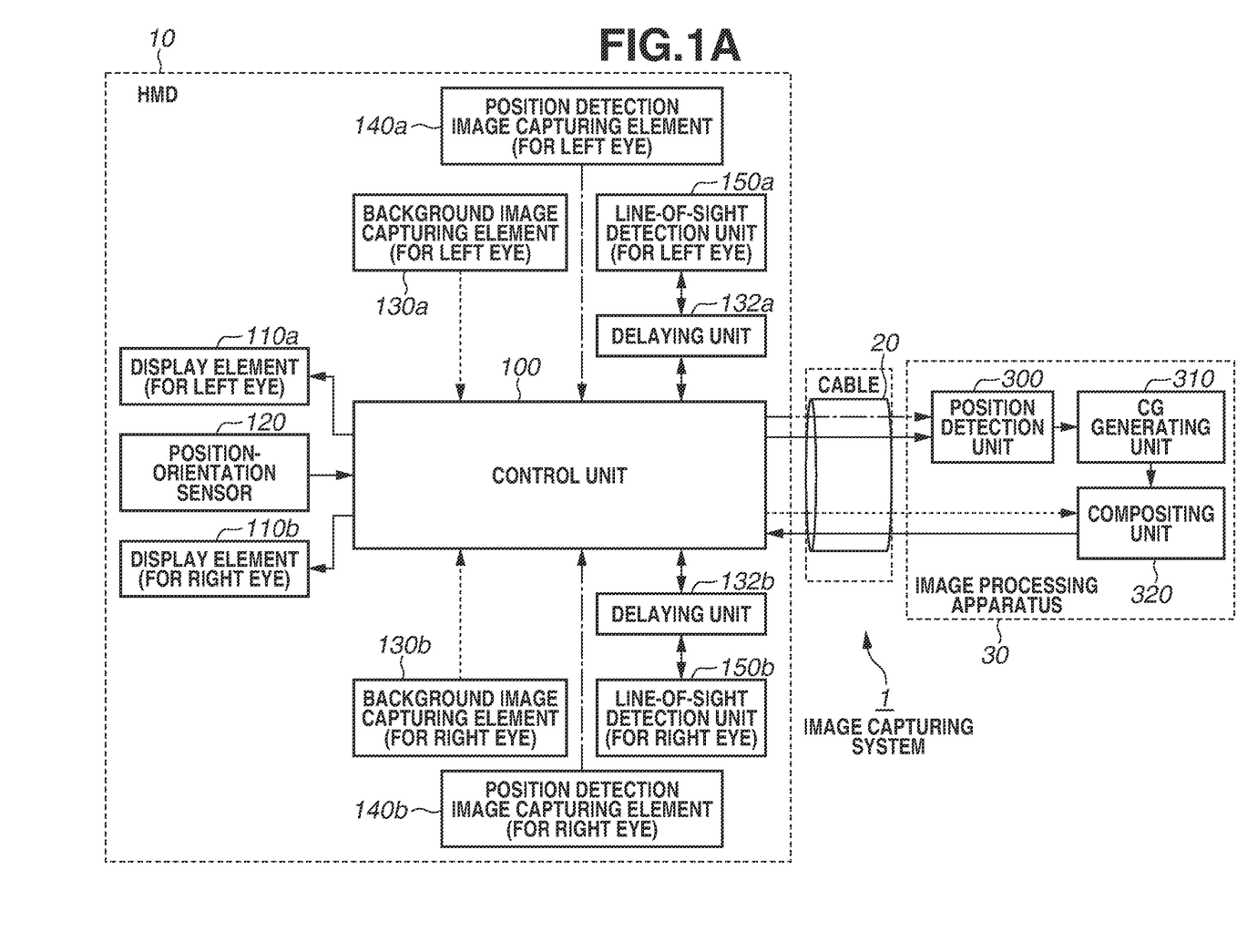
FIG. 1A is a block diagram illustrating an example of an image capturing system.
Figure 1B:
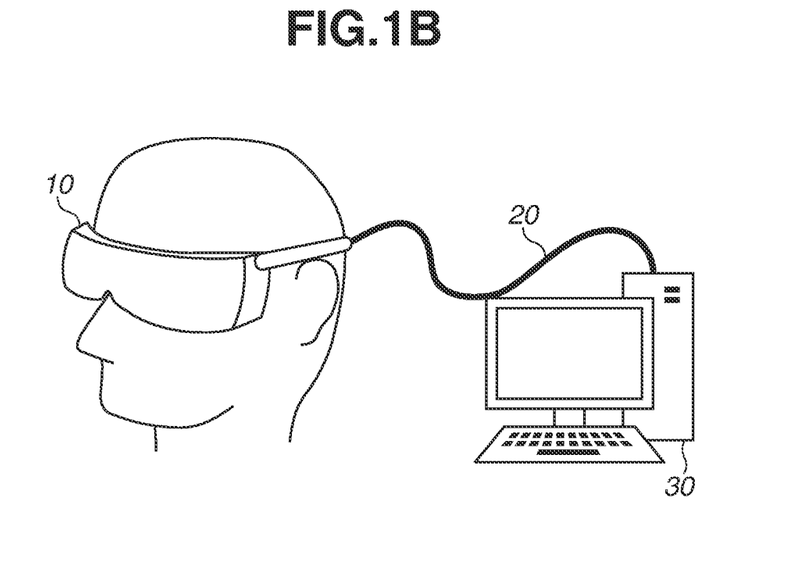
FIG. 1B illustrates an example of an appearance of the image capturing system and a user wearing an image capturing apparatus.

FIGS. 1A and 1B are examples of the configuration of an image capturing system 1 according to a first exemplary embodiment. FIG. 1A is a block diagram illustrating a configuration of the image capturing system 1, and FIG. 1B illustrates an example of an appearance of the image capturing system 1 and a user wearing an image capturing apparatus 10. The image capturing system 1 includes the image capturing apparatus 10 as a head-mounted device (HMD) (hereinafter, referred to as HMD 10), an image processing apparatus 30 (personal computer work station (PCWS)), and a cable 20. The image processing apparatus 30 generates an image of a mixed reality (MR) space created by combining a physical space and a virtual space, and provides the image (hereinafter, referred to as composite image) to the HMD 10. The cable 20 connects the HMD 10 and the image processing apparatus 30 to each other. A communication path is not limited to the cable 20 in wired connection, and a wireless connection communication path may be used.

A configuration of the HMD 10 will now be described. The HMD 10, which is an image capturing apparatus, includes a display element 110a for left eyes, a display element 110b for right eyes, a position-orientation sensor 120, a background image capturing element 130a for left eyes, a background image capturing element 130b for right eyes. The HMD 10 further includes delaying units 132a and 132b, a position detection image capturing element 140a for left eyes, a position detection image capturing element 140b for right eyes, a line-of-sight detection unit (detector) 150a for left eyes, and a line-of-sight detection unit (detector) 150b for right eyes.

The image capturing elements 130a, 130b, 140a, and 140b are complementary metal oxide semiconductors (CMOS), charge coupled devices (CCD), or another type of device. The image capturing elements 130a, 130b, 140a, and 140b acquire captured images of a physical space via an optical system in accordance with set exposure times, sensor gains, exposure start timings, and so on, based on control signals from a control unit 100.

The display elements 110a and 110b are organic light-emitting diodes (OLED) displays, or liquid crystal displays, or another type of device. The display elements 110a and 110b present composite images through an optical system to a person wearing the HMD 10 (user).

The image capturing system 1 deals with stereoscopic images using images for a right eye and images for a left eye. For this reason, the HMD 10 includes the background image capturing element 130a for left eyes, the background image capturing element 130b for right eyes, the position detection image capturing element 140a for left eyes, and the position detection image capturing element 140b for right eyes. The HMD 10 further includes the display element 110a for left eyes, the display element 110b for right eyes, the line-of-sight detection unit 150a for left eyes, and the line-of-sight detection unit 150b for right eyes.

The background image capturing elements 130a and 130b capture background images that serve as a basis for a composite image. The position detection image capturing elements 140a and 140b capture images for position detection for generating computer graphics (CG) images. Background images and position detection images are different from each other in angle of view, resolution, image processing, and the like, so that different image capturing elements, i.e., the background image capturing elements 130a and 130b, and the position detection image capturing elements 140a and 140b, are used. Background images and position detection images may be generated by performing cut-out from captured images using a type of element common to the background image capturing elements and the position detection image capturing elements.

The position-orientation sensor 120 detects position-orientation information about the HMD 10. The delaying units 132a and 132b delay display vertical synchronization signals input from the control unit 100, generate line-of-sight detection start signals, and output the line-of-sight detection start signals to line-of-sight detection units 150a and 150b, respectively. The line-of-sight detection unit 150a for left eyes performs line-of-sight detection of the line of sight of the left eye of a user wearing the HMD 10 based on a line-of-sight detection start signal, and outputs a result of the detection to the control unit 100. The line-of-sight detection unit 150b for right eyes performs line-of-sight detection of the line of sight of the right eye of the user wearing the HMD 10 based on a line-of-sight detection start signal, and outputs a result of the detection to the control unit 100.

The control unit 100 performs image processing on captured images and display images, and controls the components described above to operate in collaboration with the image processing apparatus 30. Known techniques are used for capturing and displaying stereoscopic images, and a description thereof will be omitted.

The image processing apparatus 30 includes a position detecting unit 300, a CG generating unit 310, and a compositing unit 320. The position detecting unit 300 receives position detection images transmitted from the HMD 10, position-orientation information about the HMD 10, and display positions of the display elements 110a and 110b as line-of-sight detection results from the line-of-sight detection units 150a and 150b. The position detecting unit 300 outputs information about position, size, orientation, and/or the like for generating a CG image of a virtual space to be presented to a user wearing the HMD 10 based on the received pieces of information.

The CG generating unit 310 generates a predetermined CG image for the left eye and a predetermined CG image for the right eye based on the output from the position detecting unit 300. The CG images go through rendering processing based on computer-aided design (CAD) data stored in a hard disk drive (HDD) or another type of storage medium in the image processing apparatus 30

The compositing unit 320 superimposes CG images on background images transmitted from the HMD 10, creates a composite image, and outputs the composite image as a display image to the HMD 10.

Next, the delaying units 132a and 132b will be described. The delaying units 132a and 132b receive display vertical synchronization signals that each indicate the beginning of each frame of a composite image via the control unit 100 from the compositing unit 320. The display vertical synchronization signals are input to the delaying units 132a and 132b. The delaying units 132a and 132b delay the display vertical synchronization signals by delay amounts set by the control unit 100 beforehand, generate line-of-sight detection start signals, and output the line-of-sight detection start signals to the line-of-sight detection units 150a and 150b, respectively.

Figure 2:
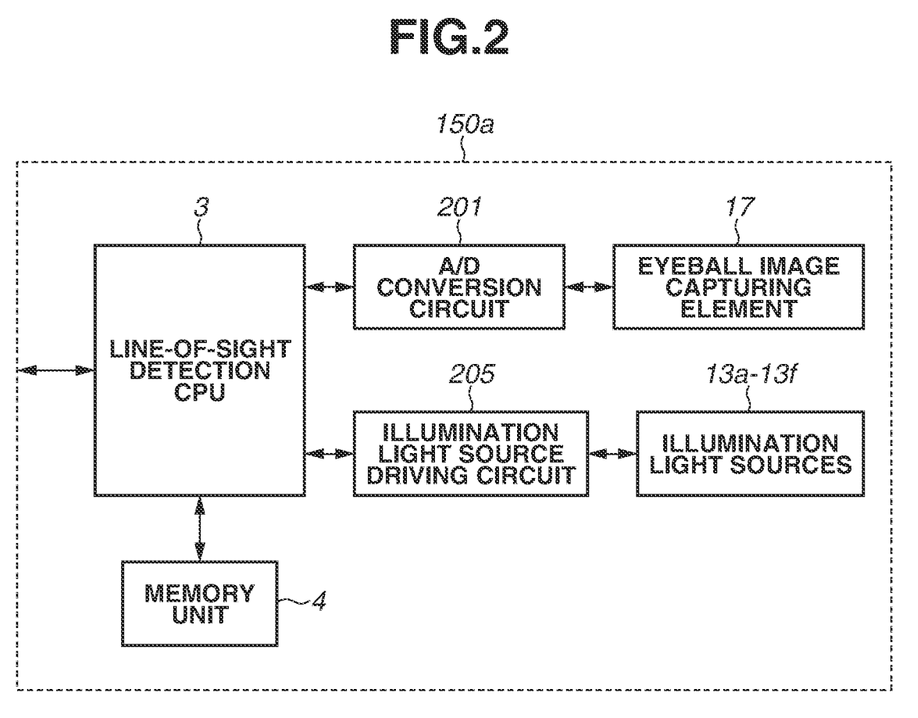
FIG. 2 illustrates an example of the configuration of a line-of-sight detection unit.

FIG. 2 illustrates an example of a configuration of the line-of-sight detection unit 150a of FIG. 1A. A line-of-sight detection start signal from the delaying unit 132a is input to the line-of-sight detection unit 150a. The line-of-sight detection unit 150a then performs line-of-sight detection, and outputs the result of the detection to the control unit 100.

Units of the line-of-sight detection unit 150a will be described. The line-of-sight detection unit 150a includes a line-of-sight central processing unit (CPU) 3, a memory unit 4, an analog/digital (A/D) conversion circuit 201, an illumination light source driving circuit 205, an eyeball image capturing element 17, and illumination light sources 13a to 13f. The line-of-sight detection CPU 3 is a central processing unit of a microcomputer. The line-of-sight detection CPU 3 is connected to the A/D conversion circuit 201, the illumination light source driving circuit 205, and the memory unit 4.

The eyeball image capturing element 17 captures eyeball images of the left eye of a user wearing the HMD 10. The A/D conversion circuit 201 performs A/D conversion on each eyeball image captured by the eyeball image capturing element 17, and outputs a digital eyeball image to the line-of-sight detection CPU 3. The line-of-sight detection CPU 3 writes the digital eyeball image in the memory unit 4.

When the line-of-sight detection start signal from delaying unit 132a is input, the line-of-sight detection CPU 3 controls the A/D conversion circuit 201 and the illumination light source driving circuit 205 to start line-of-sight detection processing. The line-of-sight detection CPU 3 acquires the digital eyeball image from the A/D conversion circuit 201, extracts features of the digital eyeball image for line-of-sight detection following a predetermined algorithm, and calculates a line-of-sight of the left eye of the user wearing the HMD 10 from positions of the features. The line of sight is calculated as coordinates of a composite image to be displayed by the display element 110a. The line-of-sight detection CPU 3 sends the coordinates of the line of sight as the calculated line-of-sight detection result to the control unit 100.

The illumination light sources 13a to 13f emit light to the eyeball of the user wearing the HMD 10 to detect the direction of the line of sight from a relationship between the pupil and an image created by the cornea's reflection of light emitted from light sources in a single-lens reflex camera or another device. The illumination light sources 13a to 13f include infrared light emitting diodes, and are arranged around a lens unit connected to the eyeball image capturing element 17.

The image of the illuminated eye and the image created by the cornea reflection with the illumination light sources 13a to 13f are formed on the eyeball image capturing element 17 formed in a two-dimensional array of photoelectronic elements, such as CMOSs, by the lens unit. The lens unit positions the pupil of the eye of the user wearing the HMD 10 and the eyeball image capturing element 17 in a conjugate relationship.

The line-of-sight detection CPU 3 uses the predetermined algorithm to detect the line of sight from the positional relationship between the eyeball as the image formed on the eyeball image capturing element 17 and the image created by the cornea's reflection with the illumination light sources 13a to 13f. Specifically, the line-of-sight detection CPU 3 detects the pupil's center and the image created by the cornea's reflection with the illumination light sources 13a to 13f from the eyeball image captured on the eyeball image capturing element 17 while the eyeball is illuminated by light emitted by the illumination light sources 13a to 13f in the predetermined line-of-sight detection algorithm. The line-of-sight detection CPU 3 calculates an angle of rotation of the eyeball from the image created by the cornea's reflection and the pupil's center, and determines the line of sight of the user wearing the HMD 10 from the angle of rotation.

The line-of-sight detection unit 150b has the same functions as the line-of-sight detection unit 150b, as well as the internal configuration. The line-of-sight detection unit 150b detects the line of sight of the right eye of the user wearing the HMD 10. The line of sight is calculated as coordinates of a composite image to be displayed by the display element 110b.

Figure 3:
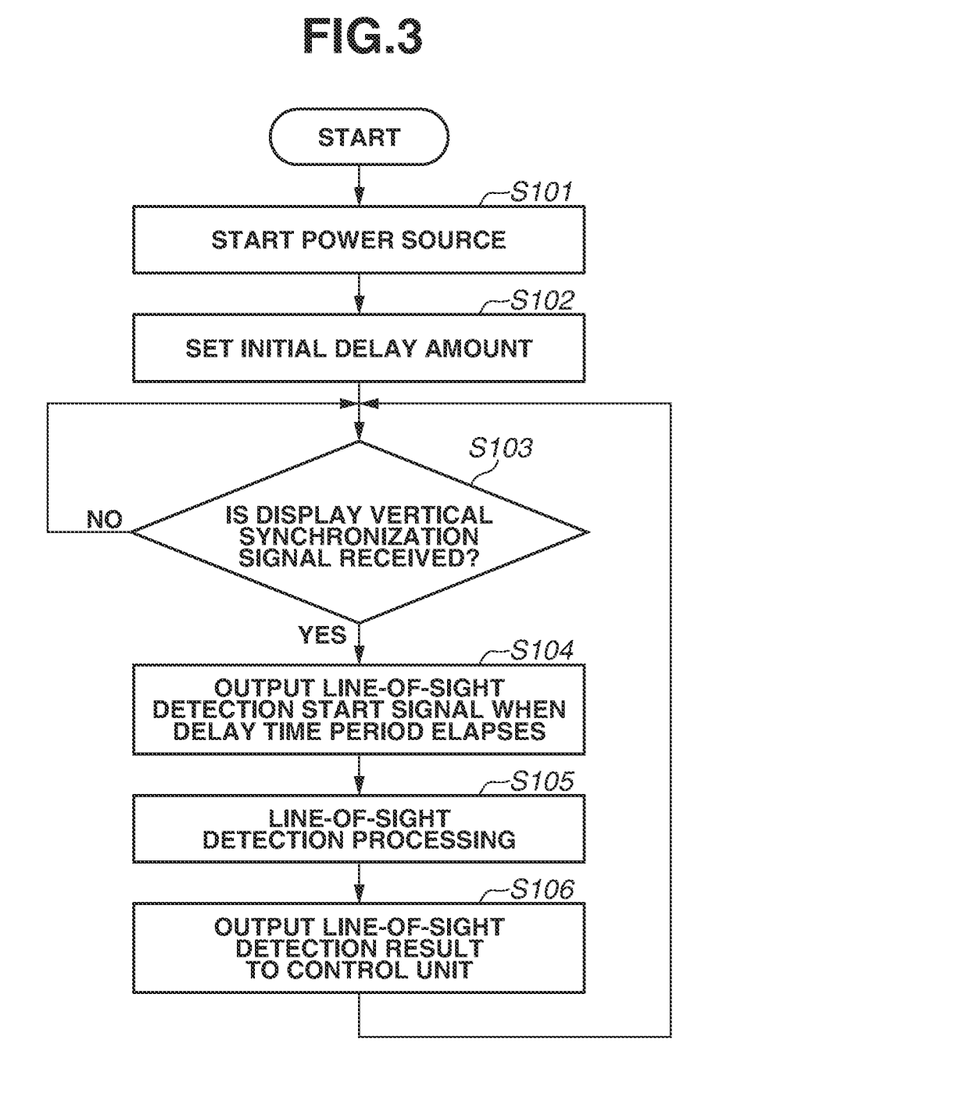
FIG. 3 is a flowchart illustrating line-of-sight detection processing in the image capturing apparatus.

FIG. 3 is a flowchart illustrating a method for image capture by the HMD 10. A method will be described that improves a cycle of reading out a line-of-sight detection result by using the line-of-sight detection units 150a and 150b and controlling line-of-sight detection start signals to be transmitted to the line-of-sight detection units 150a and 150b, respectively, in an optimal manner.

In step S101, when a power source button is pressed, the units in the image capturing system 1 are energized.

In step S102, the control unit 100 sets initial delay amounts to the delaying unit 132a and the delaying unit 132b, respectively. Delay amounts different between the delaying units 132a and 132b are settable.

In step S103, the control unit 100 determines whether a display vertical synchronization signal indicating the beginning of each frame of a composite image is received from the compositing unit 320 in the image processing apparatus 30. If no display vertical synchronization signal is received (NO in step S103), the processing returns to step S103. If a display vertical synchronization signal is received (YES in step S103), the processing proceeds to step S104.

In step S104, the control unit 100 outputs a display vertical synchronization signal to the delaying unit 132a and a display vertical synchronization signal to the delaying unit 132b, respectively. After the display vertical synchronization signal is input to the delaying unit 132a and a period corresponding to the delay amount elapses, the delaying unit 132a outputs a line-of-sight detection start signal to the line-of-sight detection unit 150a. After the display vertical synchronization signal is input to the delaying unit 132b and a period corresponding to the delay amount elapses, the delaying unit 132b outputs a line-of-sight detection start signal to the line-of-sight detection unit 150b.

In step S105, on receiving the line-of-sight detection start signal, the line-of-sight detection unit 150a performs line-of-sight detection processing on the left eye of the user wearing the HMD 10 to detect the line of sight of the left eye of the user wearing the HMD 10. On receiving the line-of-sight detection start signal, the line-of-sight detection unit 150b performs line-of-sight detection processing on the right eye of the user wearing the HMD 10 to detect the line of sight of the right eye of the user wearing the HMD 10.

In step S106, the line-of-sight detection unit 150a outputs the line-of-sight detection result of the left eye of the user wearing the HMD 10 to the control unit 100, and the line-of-sight detection unit 150b outputs the line-of-sight detection result of the right eye of the user wearing the HMD 10 to the control unit 100. After that, the processing returns to step S103.

Figure 4:
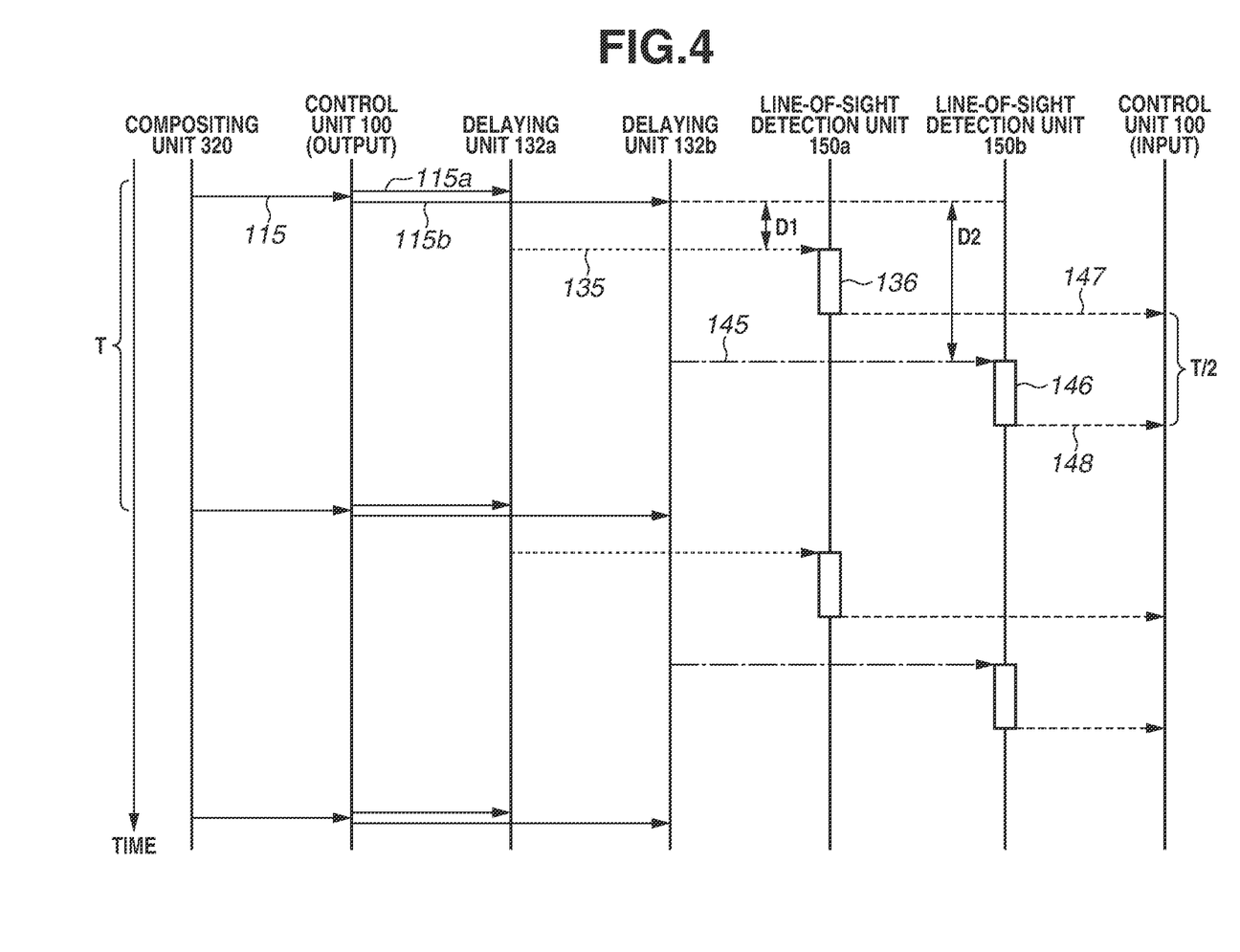
FIG. 4 is a time chart illustrating an example of a control operation of the image capturing apparatus.

FIG. 4 is a time chart illustrating an example of a control operation performed by the HMD 10 and the relationship of control signals between units. The left side of FIG. 4 illustrates timings when the compositing unit 320 transmits display vertical synchronization signals via the control unit 100 to the delaying units 132a and 132b. The right side of FIG. 4 illustrates timings when the line-of-sight detection units 150a and 150b output line-of-sight detection results to the control unit 100.

The control unit 100 receives a display vertical synchronization signal 115 from the compositing unit 320 at a frame cycle of T. After that, the control unit 100 outputs a display vertical synchronization signal 115a to the delaying unit 132a and a display vertical synchronization signal 115b to the delaying unit 132b. It is assumed herein that the display vertical synchronization signals 115a and 115b are not delayed to each other.

For example, the display vertical synchronization signal 115, which indicates the beginning of each frame of a composite image, is output at a frame rate of 60 [Hz]. In this case, the inverse of the frame rate is approximately 16.67 [ms], which is the frame cycle T. The display vertical synchronization signal 115a is input to the delaying unit 132a and the display vertical synchronization signal 115b to the delaying unit 132b at a cycle of 16.67 [ms].

Next, after the display vertical synchronization signal 115a is input to the delaying unit 132a and a period corresponding to a delay amount D1 set by the control unit 100 elapses, the delaying unit 132a outputs a line-of-sight detection start signal 135 to the line-of-sight detection unit 150a. After the display vertical synchronization signal 115b is input to the delaying unit 132b and a period corresponding to a delay amount D2 set by the control unit 100 elapses, the delaying unit 132b outputs a line-of-sight detection start signal 145 to the line-of-sight detection unit 150b.

Here, the control unit 100 can set the delay amount D2 based on the frame cycle T and the delay amount D1 using the following expression:

$$D2=(T-D1)/2$$

As described above, both of the line-of-sight detection units 150a and 150b can start line-of-sight detection at a cycle of T/2. In other words, a line-of-sight detection result 147 from the line-of-sight detection unit 150a and a line-of-sight detection result 148 from the line-of-sight detection unit 150b can be input to the control unit 100 at a cycle of T/2.

For example, when the delay amount D1 is 1 [ms], the delay amount D2 is set to 9.3 [ms] as calculated as follows:

$$D2=(16.67-1)/2=9.3 \text{ [ms]}$$

Thus, 1 [ms] as D1 after the display vertical synchronization signal 115 is input to the control unit 100, the line-of-sight detection unit 150a starts line-of-sight detection. Similarly, 9.3 [ms] as D2 after the display vertical synchronization signal 115 is input to the control unit 100, the line-of-sight detection unit 150b starts line-of-sight detection.

After the line-of-sight detection start signal 135 is input to the line-of-sight detection unit 150a, the line-of-sight detection unit 150a starts line-of-sight detection processing on the left eye, and after a line-of-sight detection processing time 136 elapses, the line-of-sight detection unit 150a outputs the line-of-sight detection result 147 of the left eye to the control unit 100. The line-of-sight detection processing time 136 is a time period from when the line-of-sight detection start signal 135 is input to the line-of-sight detection unit 150a to when the line-of-sight detection unit 150a outputs the line-of-sight detection result 147. The line-of-sight detection processing includes performing exposure with the eyeball image capturing element 17, reading out a result of the exposure with the eyeball image capturing element 17, and performing line-of-sight detection processing using an eyeball image.

After the line-of-sight detection start signal 145 is input to the line-of-sight detection unit 150b, the line-of-sight detection unit 150b starts line-of-sight detection processing on the right eye, and after a line-of-sight detection processing time 146 elapses, the line-of-sight detection unit 150b outputs a line-of-sight detection result 148 of the right eye to the control unit 100. The line-of-sight detection processing time 146 is a time period from when the line-of-sight detection start signal 145 is input to the line-of-sight detection unit 150b to when the line-of-sight detection unit 150b outputs the line-of-sight detection result 148. The line-of-sight detection processing includes performing exposure with the eyeball image capturing element 17, reading out a result of the exposure with the eyeball image capturing element 17, and performing line-of-sight detection processing using an eyeball image.

The line-of-sight detection units 150a and 150b have an identical internal configuration to each other, and the line-of-sight detection processing times 136 and 146 are the same time as each other.

Lastly, the control unit 100 can receive the line-of-sight detection result 147 from the line-of-sight detection unit 150a and the line-of-sight detection result 148 from the line-of-sight detection unit 150b at a cycle of T/2, i.e., 8.3 [ms]. In other words, the line-of-sight detection result 147 from the line-of-sight detection unit 150a and the line-of-sight detection result 148 from the line-of-sight detection unit 150b are input to the control unit 100 at a cycle of 8.3 [ms]. Thus, the line-of-sight detection results 147 and 148 are input to the control unit 100 at a cycle of 8.3 [ms], providing an improved cycle of reading out the line-of-sight detection results 147 and 148.

As described above, the HMD 10 includes the line-of-sight detection units 150a and 150b, and controls the line-of-sight detection start signals 135 and 145 to be transmitted to the line-of-sight detection units 150a and 150b, respectively, in an optimal manner. With this configuration, the HMD 10 can provide an improved cycle of reading out the line-of-sight detection results 147 and 148.

Further, in the present exemplary embodiment, the HMD 10 synchronizes the line-of-sight detection units 150a and 150b, but this does not limit the present disclosure. Even if the background image capturing elements 130a and 130b, the position detection image capturing elements 140a and 140b, the display elements 110a and 110b, or the position-orientation sensor 120 is/are absent, the HMD 10 is applicable. Further, various types of parameter can be designed as appropriate depending on the configuration of the image capturing system 1 and the usage purpose of the HMD 10

A display vertical synchronization signal to be received from the compositing unit 320 is in synchronization with the background image capturing elements 130a and 130b and the display elements 110a and 110b, but may be out of synchronization with the background image capturing elements 130a and 130b and the display elements 110a and 110b. In this case, the HMD 10 according to the present exemplary embodiment can perform the above described processing for improving a cycle of reading out the line-of-sight detection results 147 and 148.

Each of the background image capturing element 130b, the display element 110b, and the position detection image capturing element 140b, all of which are used for right eyes, may be delayed relative to each of the background image capturing element 130a, the display element 110a, and the position detection image capturing element 140a, all of which are used for left eyes.

There is an MR technique referred to as a seethrough type, by which the HMD 10 with a half mirror arranged in front of both eyes presents a mixed reality created through the half mirror by combining a physical space that a user wearing the HMD 10 is looking at directly and a CG image received from the CG generating unit 310 in the image processing apparatus 30. With this seethrough type MR technique, the HMD 10 can also perform the above described processing as long as a display vertical synchronization signal, which is to be acquired from the compositing unit 320 as described above, is newly generated using an operation clock in the control unit 100, and is used as an alternate signal. Even in this case, the HMD 10 can improve a cycle of reading out the line-of-sight detection results 147 and 148. Further, this case eliminates the need of the display elements 110a and 110b and the background image capturing elements 130a and 130b.

As described above, the line-of-sight detection unit 150a captures a first eyeball image and detects a first line of sight based on the first eyeball image at the cycle T. The line-of-sight detection unit 150b captures a second eyeball image and detects a second line of sight based on the second eyeball image at the cycle T. For example, the first eyeball image is an eyeball image of a left eyeball, and the second eyeball image is an eyeball image of a right eyeball. A timing of starting to capture the first eyeball image and a timing of starting to capture the second eyeball image are different from each other.

The line-of-sight detection unit 150*a* outputs the line-of-sight detection result 147. The line-of-sight detection unit 150*b* outputs the line-of-sight detection result 148. A timing of outputting the line-of-sight detection result 147 and a timing of outputting the line-of-sight detection result 148 are different from each other. The timing of outputting the line-of-sight detection result 148 is different from the timing of outputting the line-of-sight detection result 147 by half the cycle T.

The line-of-sight detection unit 150*a* starts the processing based on the line-of-sight detection start signal 135. The line-of-sight detection unit 150*b* starts the processing based on the line-of-sight detection start signal 145. A timing of inputting the line-of-sight detection start signal 135 and a timing of inputting the line-of-sight detection start signal 145 are different from each other. The timing of inputting the line-of-sight detection start signal 145 is different from the timing of inputting the line-of-sight detection start signal 135 by half the cycle T.

The delaying unit 132*b* generates the line-of-sight detection start signal 145 delayed with respect to the line-of-sight detection start signal 135. The delaying unit 132*a* generates the line-of-sight detection start signal 135 by delaying the display vertical synchronization signal 115*a* by the delay amount D1. The delaying unit 132*b* generates the line-of-sight detection start signal 145 by delaying the display vertical synchronization signal 115*b* by the delay amount D2.

The display element 110*a* is a display unit that displays images based on the line-of-sight detection result 147. The display element 110*b* is a display unit that displays images based on the line-of-sight detection result 148.

Thus, according to the present exemplary embodiment, the HMD 10 can improve a cycle of reading out the line-of-sight detection results 147 and 148 without using an image capturing element supporting high frame rates that causes higher cost or without increasing communication bus width to improve data transfer bandwidth between devices. The HMD 10 controls the timings of transmitting line-of-sight detection start signals 135 and 145 to the line-of-sight detection units 150*a* and 150*b*, respectively, appropriately, providing an improved cycle of reading out the line-of-sight detection start signals 147 and 148. This enables the HMD 10 to improve a cycle of reading out the line-of-sight detection results 147 and 148, providing a high-quality line-of-sight detection. This makes it possible for the HMD 10 to perform a rapid detection of lines of sight even if a composite image moves at high speed.

A second exemplary embodiment will be described. As a technique of measuring the distance to an object a user wearing the HMD 10 is watching, a technique is known of combining left-eye's line-of-sight detection display coordinates, right eye's line-of-sight detection display coordinates, and a focal length of the eyeball image capturing element 17 relative to an origin as a focal point of the eyeball image capturing element 17 and then calculating a vergence angle using trigonometric functions. The farther distance to the object the user wearing the HMD 10 is watching is, the smaller the vergence angle is. Thus, the vergence angle is useful as positional information about the distance to the object. In this case, it is suitable that images obtained from the eyeball image capturing elements 17 in the left eyeball image capturing element 150*a* and the right eyeball image capturing element 150*b* are in synchronization with each other. Thus, to measure a distance to an object the user wearing the HMD 10 is watching, the control unit 100 controls the related units to acquire an image from the eyeball image capturing element 17 in the line-of-sight detection unit 150*a* and an image from the eyeball image capturing element 17 in the line-of-sight detection unit 150*b* in synchronization with each other.

The configuration of the image capturing system 1 according to the second exemplary embodiment is identical to that of the image capturing system 1 according to the first exemplary embodiment illustrated in FIGS. 1A, 1B and 2. The processing performed by the image capturing system 1 according to the second exemplary embodiment is the same as the processing performed by the image capturing system 1 according to the first exemplary embodiment illustrated in FIG. 3.

Figure 5:
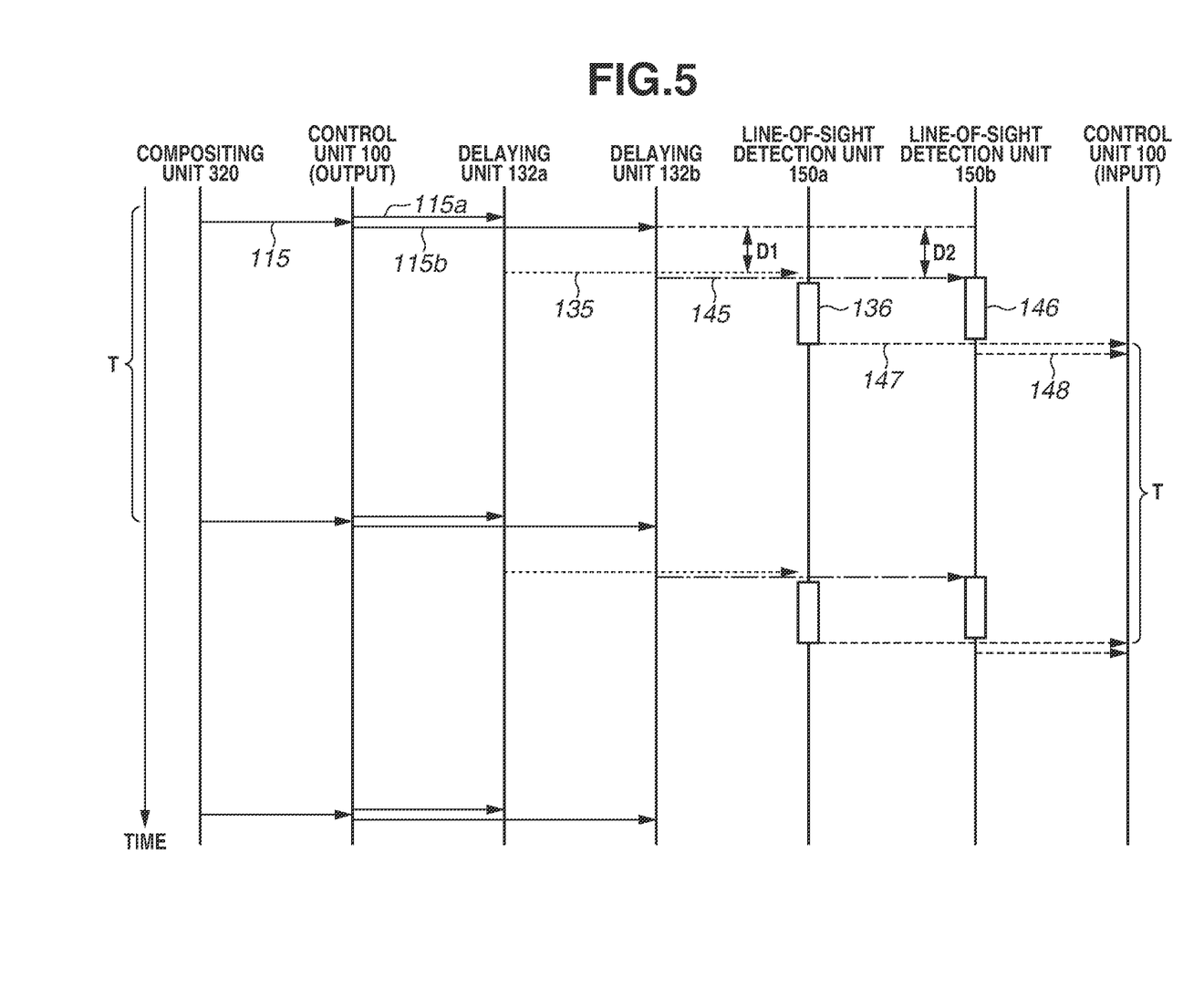
FIG. 5 is a time chart illustrating an example of another control operation of the image capturing apparatus.

FIG. 5 is a time chart illustrating an example of a control operation performed by the HMD 10, and illustrates timings when images from the eyeball image capturing elements 17 in the line-of-sight detection units 150*a* and 150*b* are acquired, according to the second exemplary embodiment. The following is a description of the difference of FIG. 5 from FIG. 4.

The control unit 100 receives the display vertical synchronization signal 115 from the compositing unit 320 at a frame cycle of T. The control unit 100 then outputs the display vertical synchronization signal 115*a* to the delaying unit 132*a* and the display vertical synchronization signal 115*b* to the delaying unit 132*b*. It is assumed herein that the display vertical synchronization signals 115*a* and 115*b* are not delayed to each other.

Subsequently, the display vertical synchronization signal 115*a* is input to the delaying unit 132*a*, and then after a period corresponding to a delay amount D1 elapses, the delaying unit 132*a* outputs the line-of-sight detection start signal 135 to the line-of-sight detection unit 150*a*. The display vertical synchronization signal 115*b* is input to the delaying unit 132*b*, and then after a period corresponding to a delay amount D2 elapses, the delaying unit 132*b* outputs the line-of-sight detection start signal 145 to the line-of-sight detection unit 150*b*. The delay amount D1 and the delay amount D2 are the same as each other. In other words, the timing of outputting the line-of-sight detection start signal 135 and the timing of outputting the line-of-sight detection start signal 145 are the same as each other.

The line-of-sight detection start signal 135 is input to the line-of-sight detection unit 150*a*, and the line-of-sight detection unit 150*a* starts line-of-sight detection processing on the left eye. After the line-of-sight detection processing time 136 elapses, the line-of-sight detection unit 150*a* outputs the line-of-sight detection result 147 of the left eye to the control unit 100. The line-of-sight detection processing time 136 is a time period from when the line-of-sight detection start signal 135 is input to the line-of-sight detection unit 150*a* to when the line-of-sight detection unit 150*a* outputs the line-of-sight detection result 147.

The line-of-sight detection start signal 145 is input to the line-of-sight detection unit 150*b*, and the line-of-sight detection unit 150*b* then starts line-of-sight detection processing on the right eye. After the line-of-sight detection processing time 146 elapses, the line-of-sight detection unit 150*b* outputs the line-of-sight detection result 148 of the right eye to the control unit 100. The line-of-sight detection processing time 146 is a time period from when the line-of-sight detection start signal 145 is input to the line-of-sight detection unit 150*b* to when the line-of-sight detection unit 150*b* outputs the line-of-sight detection result 148.

The line-of-sight detection processing times 136 and 146 are the same as each other. The line-of-sight detection result 147 from the line-of-sight detection unit 150*a* and the line-of-sight detection result 148 from the line-of-sight detection unit 150*b* are input to the control unit 100 at the same time. The simultaneous input of the line-of-sight detection results 147 and 148 allows the control unit 100 to measure a distance to an object the user wearing the HMD 10 is watching.

Both of the line-of-sight detection units 150*a* and 150*b* can start line-of-sight detection at a cycle of T. Further, the line-of-sight detection results 147 and 148 from the line-of-sight detection units 150*a* and 150*b* can be input to the control unit 100 at a cycle of T.

As described above, in order that the line-of-sight detection result 147 from line-of-sight detection unit 150*a* and the line-of-sight detection result 148 from the line-of-sight detection unit 150*b* may be input to the control unit 100 at the same time, it is suitable that the delaying units 132*a* and 132*b* output line-of-sight detection start signals 135 and 145, respectively, at the same time. To perform this processing, it is suitable that the delay amount D1 to be set at the delaying unit 132*a* and the delay amount D2 to be set at the delaying unit 132*b* are set to the same value. The display vertical synchronization signal 115 is input to the control unit 100, and the control unit 100 then transmits the display vertical synchronization signals 115*a* and 115*b* to the delaying units 132*a* and 132*b*, respectively. This allows the control unit 100 to measure the distance to the object the user wearing the HMD 10 is watching.

Similarly, if the control unit 100 measures an interpupillary distance as a distance between the pupils of left and right eyes, it is suitable that the same value is set to the delay amount D1 at the delaying unit 132*a* and the delay amount D2 at the delaying unit 132*b*. This allows the control unit 100 to measure the interpupillary distance by acquiring left and right images, in synchronization with each other, from the eyeball image capturing elements 17 in the line-of-sight detection units 150*a* and 150*b*.

Similarly, if line-of-sight calibration on the user wearing the HMD 10 is performed while the control unit 100 displays a standard pattern, it is suitable that the same value is set to the delay amounts D1 and D2 at the delaying units 132*a* and 132*b*. The control unit 100 can acquire left and right images, in synchronization with each other, from the eyeball image capturing elements 17 in the line-of-sight detection units 150*a* and 150*b*, display the standard pattern, and perform the line-of-sight calibration on the user wearing the HMD 10.

On the other hand, if a low priority is given to the calculation of the distance to the object due to the increased distance to the object the user wearing the HMD 10 is watching, the control unit can detect that fact, and make the delay amounts D1 and D2 at the delaying units 132*a* and 132*b* different from each other. This allows the operations performed by the line-of-sight detection units 150*a* and 150*b* to be changed dynamically. For example, the moment a menu operation graphical user interface (GUI) is displayed, the control units detects that fact, and sets the delay amounts D1 and D2 at the delaying units 132*a* and 132*b* to different values from each other, to enhance the performance of acquiring line-of-sight detection results. This is applicable to cases, such as a case of improving a cycle of reading out a line-of-sight detection result.

Another example is a case where a virtual reality (VR) image composed of a CG image is to be displayed. In this case, the control unit 100 can detect that fact, and set the delay amounts D1 and D2 at the delaying units 132*a* and 132*b* to different values from each other, to enhance the performance of acquiring line-of-sight detection results.

Thus, a cycle of reading out a line-of-sight detection result may be improved.

Further, yet another example is a case where the movement of an object being watched is slow. In this case, the control unit 100 can detect no change in the movement of the object, and set the delay amounts D1 and D2 at the delaying units 132*a* and 132*b* to different values from each other, to enhance the performance of acquiring line-of-sight detection results. This improves a cycle of reading out a line-of-sight detection result.

Further, yet another example is a case of a line-of-sight tracking priority mode, such as foveated rendering. In this case, the control unit 100 can set the delay amounts D1 and D2 at the delaying units 132*a* and 132*b* to different values from each other, to improve a cycle of reading out a line-of-sight detection result. This improves the speed of acquiring line-of-sight detection results.

As yet another example, the control unit 100 calculates an average of display coordinates of left eye's line-of-sight detection results and an average of display coordinates of right eye's line-of-sight detection results. After that, if the difference between the average of display coordinates of left eye's line-of-sight detection results and the average of display coordinates of right eye's line-of-sight detection results exceeds a threshold, the control unit 100 sets the delay amounts D1 and D2 at the delaying units 132*a* and 132*b* to different values from each other. This improves the speed of acquiring line-of-sight detection results. On the other hand, if the difference between the average of display coordinates of left eye's line-of-sight detection results and the average of display coordinates of right eye's line-of-sight detection results falls within the threshold, the control unit 100 sets the delay amounts D1 and D2 at the delaying units 132*a* and 132*b* to the same value as each other. This enhances the reliability of line-of-sight detection by acquiring left and right images, in synchronization with each other, from the eyeball image capturing elements 17 in the line-of-sight detection units 150*a* and 150*b*. Consequently, the control unit 100 can dynamically change both values using a threshold.

As described above, the line-of-sight detection unit 150*a* captures a first eyeball image and detects a first line of sight based on the first eyeball image at a cycle of T. The line-of-sight detection unit 150*b* captures a second eyeball image and detects a second line of sight based on the second eyeball image at a cycle of T. For example, the first eyeball image is a left eyeball image, and the second eyeball image is a right eyeball image. The difference between a timing of starting to capture the first eyeball image and a timing of starting to capture the second eyeball image is changed depending on the state of the HMD 10, the user setting, and the operation from the user.

The control unit 100 can calculate a parallax, a vergence angle, or an interpupillary distance or perform line-of-sight calibration based on the line-of-sight detection result 147 and the line-of-sight detection result 148. In this case, the control unit 100 controls a timing of starting to capture the first eyeball image by the line-of-sight detection unit 150*a* and a timing of starting to capture the second eyeball image by the line-of-sight detection unit 150*b* to be the same as each other.

The display element 110*a* displays an image based on the line-of-sight detection result 147. The display element 110*b* displays an image based on the line-of-sight detection result 148. When the display elements 110*a* and 110*b* display operation screens through user operation, the control unit 100 controls a timing of starting to capture the first eyeball image by the line-of-sight detection unit 150*a* and a timing of starting to capture the second eyeball image by the line-of-sight detection unit 150*b* to be the different from each other.

The control unit 100 calculates a vergence angle based on the line-of-sight detection results 147 and 148. If the vergence angle is smaller than a threshold, the control unit 100 controls a timing of starting to capture the first eyeball image by the line-of-sight detection unit 150*a* and a timing of starting to capture the second eyeball image by the line-of-sight detection unit 150*b* to be different from each other.

Consequently, according to the present exemplary embodiment, the control unit 100 can change the performance of acquiring line-of-sight detection results with flexibility by changing the delay amounts D1 and D2 at the delaying units 132*a* and 132*b* dynamically, providing line-of-sight detection functions responding to requests from various user applications.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-116420, filed Jul. 21, 2022, which is hereby incorporated by reference herein in its entirety.

What is claimed is:

1. An image capturing apparatus comprising:
a first line-of-sight detector configured to capture a first eyeball image as a left eyeball image and detect a first line of sight based on the first eyeball image at a first cycle;
a second line-of-sight detector configured to capture a second eyeball image as a right eyeball image and detect a second line of sight based on the second eyeball image at the first cycle;
a first display unit configured to display a first image based on a result of detecting the first line of sight; and
a second display unit configured to display a second image based on a result of detecting the second line of sight,
wherein a timing of starting to capture the first eyeball image and a timing of starting to capture the second eyeball image are different from each other.

2. The image capturing apparatus according to claim 1,
wherein the first line-of-sight detector outputs a result of detecting the first line of sight,
wherein the second line-of-sight detector outputs a result of detecting the second line of sight, and
wherein a timing of outputting the result of detecting the first line of sight and a timing of outputting the result of detecting the second line of sight are different from each other.

3. The image capturing apparatus according to claim 1,
wherein the first line-of-sight detector starts processing based on a first start signal,
wherein the second line-of-sight detector starts processing based on a second start signal, and
wherein a timing of inputting the first start signal and a timing of inputting the second start signal are different from each other.

4. The image capturing apparatus according to claim 1, wherein the timing of starting to capture the second eyeball image is different from the timing of starting to capture the first eyeball image by a period corresponding to a half of the first cycle.

5. An image capturing apparatus comprising:
a first line-of-sight detector configured to capture a first eyeball image as a left eyeball image and detect a first line of sight based on the first eyeball image at a first cycle and output a result of detecting the first line of sight; and
a second line-of-sight detector configured to capture a second eyeball image as a right eyeball image and detect a second line of sight based on the second eyeball image at the first cycle and output a result of detecting the second line of sight,
wherein the timing of outputting the result of detecting the second line of sight is different from the timing of outputting the result of detecting the first line of sight by a period corresponding to a half of the first cycle.

6. The image capturing apparatus according to claim 3, wherein the timing of inputting the second start signal is different from the timing of inputting the first start signal by a period corresponding to a half of the first cycle.

7. The image capturing apparatus according to claim 3, further comprising a delaying unit configured to generate the second start signal that is delayed with respect to the first start signal.

8. The image capturing apparatus according to claim 7, wherein the delaying unit generates the first start signal by delaying a display vertical synchronization signal by a first delay amount, and generates the second start signal by delaying the display vertical synchronization signal by a second delay amount.

9. An image capturing apparatus comprising:
   a first line-of-sight detector configured to capture a first eyeball image as a left eyeball image and detect a first line of sight based on the first eyeball image at a first cycle; and
   a second line-of-sight detector configured to capture a second eyeball image as a right eyeball image and detect a second line of sight based on the second eyeball image at the first cycle,
   wherein a difference between a timing of starting to capture the first eyeball image and a timing of starting to capture the second eyeball image is changed depending on a state of the image capturing apparatus, a user setting, or an operation from a user.

10. The image capturing apparatus according to claim 9, further comprising a control unit configured to control, in a case where a parallax, a vergence angle, or an interpupillary distance is calculated, or line-of-sight calibration is performed, based on a result of detecting the first line of sight and a result of detecting the second line of sight, a timing of starting to capture the first eyeball image by the first line-of-sight detector and a timing of starting to capture the second eyeball image by the second line-of-sight detector to be the same as each other.

11. The image capturing apparatus according to claim 9, further comprising:
   a first display unit configured to display a first image based on a result of detecting the first line of sight; and
   a second display unit configured to display a second image based on a result of detecting the second line of sight.

12. The image capturing apparatus according to claim 11, further comprising a control unit configured to control, in a case where operation screens are displayed on the first display unit and the second display unit by operation performed by a user, the timing of starting to capture the first eyeball image by the first line-of-sight detector and the timing of starting to capture the second eyeball image by the second line-of-sight detector to be different from each other.

13. The image capturing apparatus according to claim 9, further comprising a control unit configured to control, in a case where a vergence angle calculated based on a result of detecting the first line of sight and a result of detecting the second line of sight is smaller than a first threshold, the timing of starting to capture the first eyeball image by the first line-of-sight detector and the timing of starting to capture the second eyeball image by the second line-of-sight detector to be different from each other.

14. An image capturing method for an image capturing apparatus, the image capturing method comprising:
   capturing a first eyeball image as a left eyeball image and detecting a first line of sight based on the first eyeball image at a first cycle;
   capturing a second eyeball image as a right eyeball image and detecting a second line of sight based on the second eyeball image at the first cycle;
   displaying, on a first display unit, a first image based on a result of detecting the first line of sight; and
   displaying, on a second display unit, a second image based on a result of detecting the second line of sight,
   wherein a timing of starting to capture the first eyeball image and a timing of starting to capture the second eyeball image are different from each other.

15. A non-transitory computer-readable storage medium storing a program that causes a computer to execute an image capturing method for an image capturing apparatus, the image capturing method comprising:
   capturing a first eyeball image as a left eyeball image and detecting a first line of sight based on the first eyeball image at a first cycle;
   capturing a second eyeball image as a right eyeball image and detecting a second line of sight based on the second eyeball image at the first cycle;
   displaying, on a first display unit, a first image based on a result of detecting the first line of sight; and
   displaying, on a second display unit, a second image based on a result of detecting the second line of sight,
   wherein a timing of starting to capture the first eyeball image and a timing of starting to capture the second eyeball image are different from each other.

* * * * *